United States Patent [19]

Igarashi et al.

[11] Patent Number: 5,223,571
[45] Date of Patent: Jun. 29, 1993

[54] GAS-IMPERMEABLE RESINOUS COMPOSITION

[75] Inventors: Ichiro Igarashi, Komaki; Hiroaki Ito, Inuyama, both of Japan

[73] Assignee: Tokai Rubber Industries, Ltd., Aichi, Japan

[21] Appl. No.: 821,882

[22] Filed: Jan. 17, 1992

Related U.S. Application Data

[62] Division of Ser. No. 357,791, May 30, 1989, abandoned.

[30] Foreign Application Priority Data

Jun. 6, 1988 [JP] Japan ................... 63-138920

[51] Int. Cl.⁵ .............. C08L 29/04; C08L 77/06; F16L 9/12
[52] U.S. Cl. ................ 525/58; 525/178; 525/184; 138/123; 138/124; 138/125; 138/126; 138/132; 138/137; 138/138; 138/141; 138/153; 528/335; 528/339; 428/36.1; 428/36.2; 428/36.8; 428/36.9
[58] Field of Search ............ 528/335, 339; 138/123, 138/125, 124, 126, 132, 137, 138, 141, 153; 428/36.1, 36.2, 36.8, 36.9, 215, 475.8, 492, 494; 525/58, 178, 184

[56] References Cited

U.S. PATENT DOCUMENTS

| | | | |
|---|---|---|---|
| 2,130,948 | 9/1938 | Carothers | 528/335 |
| 3,549,516 | 12/1970 | Kirkaldy | 528/335 |
| 3,857,754 | 12/1974 | Hirata et al. | 525/58 |
| 4,633,912 | 1/1987 | Pilkington et al. | 428/36.2 |
| 4,734,305 | 3/1988 | Sugimoto et al. | 428/36.2 |
| 4,749,744 | 6/1988 | Uejo et al. | 525/58 |
| 4,881,576 | 11/1989 | Kitami et al. | 428/474.7 |

FOREIGN PATENT DOCUMENTS 0002099 1/1982 Japan .................. 428/36.2

Primary Examiner—John Kight, III
Assistant Examiner—Richard Jones
Attorney, Agent, or Firm—Oliff & Berridge

[57] ABSTRACT

A refrigerant-transport hose having an inner tube, an outer tube located radially outwardly of the inner tube, and a reinforcing fiber layer interposed between the inner and outer tubes, the reinforcing fiber layer and the inner and outer tubes providing an integral tubular body, and inner tube including a gas-impermeable resinous layer formed of a composition containing a polyamide resin produced by reaction of hexamethylene diamine and an aliphatic dicarboxylic acid having eight to sixteen carbon atoms.

8 Claims, 1 Drawing Sheet

GAS-IMPERMEABLE RESINOUS COMPOSITION

This is a division of application Ser. No. 07/357,791 filed May 30, 1989, now abandoned.

BACKGROUND OF THE INVENTION

1. Field of the Invention

The present invention generally relates to a gas-impermeable resinous composition and particularly to such composition used for forming members or parts which are required to have an excellent flexibility and heat resistance together with a high gas impermeability.

2. Discussion of the Prior Art

Conventionally resin such as nylon 6 has been used for forming members or parts which are required to have high gas impermeability. However, the nylon 6 and other gas-impermeable resins are comparatively rigid, and therefore such materials are not suitable for forming members which are additionally required to have high flexibility.

Referring to FIG. 5 there is shown a conventional refrigerant-transporting hose used as piping of car coolers, air conditioners and the like of automotive vehicles. The hose has a three-laminated or -layered structure consisting of an inner and an outer rubber tube 101, 103 and a reinforcing fiber layer 102 interposed between the inner and outer tubes 101, 103. The rubber hose has a high flexibility and therefore is handled with ease, for example in providing a refrigerant-using device with piping. On the other hand, rubber materials have a comparatively high gas permeability, that is, a comparatively low gas impermeability. Thus, the rubber hose suffers from the problem of progressive leakage of the refrigerant gas conveyed therethrough. Accordingly, it is necessary to often charge the refrigerant-using device with the refrigerant for compensating for lost fractions to maintain an optimum cooling capacity of the device. It goes without saying that is very troublesome.

There is a tendency that refrigerant discharged from the compressor of a cooling system for an automotive engine has raised temperature, which tendency results from raised speed of rotation of the engine. There is also a tendency that ambient air around an engine has increased temperature, which tendency results from small-sized engine room. Thus, it is necessary that refrigerant transporting hoses have excellent heat resistance. However, the above-mentioned conventional rubber hose has the problem that cracks are likely to be produced in the inner rubber tube if the hose is used at raised temperatures for a long period of time. That is, the hose does not have a reliable quality. In the case where hoses are formed of rubber material with high heat resistance, then such rubber material has an unsatisfactory gas impermeability, resulting in hoses produced with a low gas impermeability when compared with the above-mentioned conventional hose.

In the background described above, it has been proposed to form the inner tube of a hose of a resin which is excellent in both gas impermeability and heat resistance, in place of or in combination with rubber. However, in the case where nylon 6 is used as the resin, the material has a very high rigidity, and when used for producing hoses the material extremely lowers the flexibility of the hoses produced. Thus, nylon 6 is not suitable for practical use. In the case where a resin with a lower rigidity, such as nylon 6-66 copolymer and nylon 6-12 copolymer, is used to improve the flexibility of hoses, such resins have a melting point considerably lower than nylon 6 and do not satisfy the requirement of sufficient heat resistance.

The conventional gas-impermeable resins are unsatisfactory with regard to flexibility, and the resins with increased flexibility suffer from low heat resistance. Thus, none of the conventional resins have been suitable as material for forming members, such as refrigerant-transporting hoses, packings or the like, which are required to have high flexibility and heat resistance together with high gas impermeability.

SUMMARY OF THE INVENTION

Figure 1:
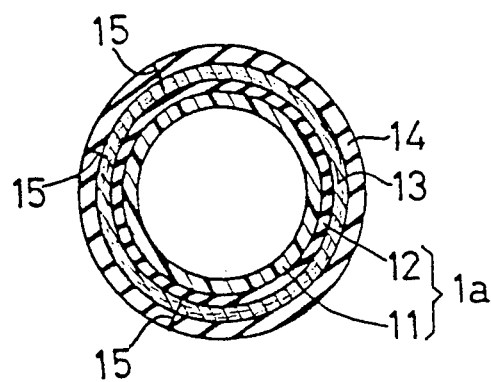
FIG. 1 is a transverse cross sectional view of a refrigerant transporting hose including a resinous layer formed of the gas-impermeable resinous composition embodying the present invention.

It is an object of the present invention to provide a gas-impermeable resinous composition used for forming a member or part thereof which has excellent gas impermeability, heat resistance and flexibility.

The Inventors have searched for a resinous material which is satisfactory with regard to gas impermeability, heat resistance and flexibility, by testing various resins, and have found that common polyamide resins such as nylon 6 and nylon 6-66 copolymer are not suitable and that a specific polyamide resin produced by condensation polymerization of hexamethylene diamine and an aliphatic dicarboxylic acid whose molecule has 8 to 16 carbon atoms (hereinafter, referred to as "CPA resin"), is suitable for that purpose. That is, the CPA resin is satisfactory with regard to the three requirements, i.e. high gas impermeability, flexibility and heat resistance. Based on these findings the present invention has been developed.

According to the present invention, there is provided a gas-impermeable resinous composition comprising a major component thereof a polyamide resin produced by the reaction of hexamethylene diamine and an aliphatic dicarboxylic acid whose molecule has from eight to sixteen carbon atoms.

The gas-impermeable resinous composition according to the invention is used as a material for forming members or parts thereof which are satisfactory with regard to gas impermeability, flexibility and heat resistance. Consequently the instant composition is very suitable for forming refrigerant-transporting hoses, packings and the like of car coolers, air conditioners and other refrigerant-using devices which are required to have excellent heat resistance, seal characteristics and gas impermeability for a long period of service. Further, the composition is advantageously used for producing containers for containing therein food, medicine or the like, packaging materials, and wrapping films.

As mentioned above, the CPA resin contained in the resinous composition of the invention is produced by condensation polymerization of hexamethylene diamine and an aliphatic dicarboxylic acid.

It is essential that the aliphatic dicarboxylic acid used for producing the CPA resin, have eight to sixteen carbon atoms. The dicarboxylic acid is expressed by the following formula:

HOOC—R—COOH where R is an aliphatic residue having carbon atoms ranging from six to fourteen. In the case where the number of carbon atoms of the aliphatic residue R is less than six, an article formed of the composition containing the CPA resin produced by using such aliphatic dicarboxylic acid, is extremely rigid, that is, unsatisfactory with regard to flexibility. For example, if a refrigerant-transporting hose is formed of the composition, the hose produced suffers from low flexibility. On the other hand, in the case where the number is more than fourteen, the produced article, for example hose has a low melting point and suffers from low gas impermeability.

As the aliphatic dicarboxylic acid having 8 to 16 carbon atoms, suberic acid, azelaic acid, sebacic acid, undecanedicarboxylic acid, dodecanedicarboxylic acid, tridecanedicarboxylic acid, tetradecanedicarboxylic acid, pentadecanedicarboxylic acid, and hexadecanedicarboxylic acid are preferably used. In particular, sebacic acid and dodecanedicarboxylic acid are suitable. These acids may be used solely or in combination. In other words, the hexamethylene diamine is reacted with at least one of the acids to obtain the CPA resin.

The gas-impermeable resinous composition may consist of the CPA resin. In this case, the resinous composition contains 100% of the CPA resin.

Where the gas-impermeable resinous composition further contains saponified ethylene-vinyl acetate copolymer in addition to the CPA resin, the resinous composition exhibits more effective characteristics. The saponified ethylene-vinyl acetate copolymer has a heat resistance comparable to the CPA resin and an excellent gas impermeability.

It is recommended that the saponified ethylene-vinyl acetate copolymer contain not more than 40 mol % of ethylene and not less than 90 mol % of the vinyl acetate of the ethylene-vinyl acetate copolymer be saponified. If the proportion of the ethylene exceeds 40 mol %, or if the degree of saponification of the vinyl acetate is below 90 mol %, the heat resistance of the product formed of the resinous composition tends to be lowered to an insufficient level.

It is preferred that the gas-impermeable resinous composition contain not more than 250 parts by weight of the saponified ethylene-vinyl acetate copolymer per 100 parts by weight of the CPA resin. If the proportion of the copolymer exceeds 250 parts by weight, the flexibility of the product is insufficiently low, though the gas impermeability thereof is increased.

The gas-impermeable resinous composition of the invention may be prepared by a known resin-composition preparing method by using the above-described material(s). For example, in the case of the gas-impermeable resinous composition consisting of the mixture of CPA resin and saponified ethylene-vinyl acetate copolymer, pellets of the two substances are subjected to dry blend and subsequently kneaded by a twin-screw extruder.

In addition to the above-indicated component(s), the resinous composition according to the invention may further contain, if necessary, halogen-containing rubber such as chlorosulfonated polyethylene rubber (CSM), chlorinated polyethylene (CPE), epichlorohydrin rubber (CHC, CHR) and chlorinated isobutylene-isoprene rubber (Cl-IIR), and/or rubber such as ethylene propylene diene rubber (EPDM) and acrylonitrile-butadiene rubber (NBR). In this case, it is preferred that the resinous composition contain not more than 70 parts by weight of the additional rubber per 100 parts by weight of the CPA resin. If the proportion of the rubber exceeds 70 parts by weight, the gas impermeability of the product is insufficient.

The gas-impermeable resinous composition is used for providing, for example, an inner tube of a refrigerant-transporting hose as shown in FIG. 1. The hose consists of a resinous layer 11 through which refrigerant is transported, an outer rubber layer 12 located radially outwardly of the resinous layer 11, an outer rubber tube 14 located radially outwardly of the outer rubber layer 12, and a reinforcing fiber layer 13 interposed between the outer rubber layer 12 and the outer rubber tube 14 such that the intermediate fiber layer 13 and the other layers and tube 11, 12, 14 constitute an integral tubular body. The resinous layer 11 is formed of a resinous composition which contains as a major component thereof the CPA resin or the mixture of CPA resin and saponified ethylene-vinyl acetate copolymer, each previously described. Reference numerals 15 designate spiking holes formed through the outer rubber tube 14 from an exposed, outer surface of the outer tube 14 to the fiber layer 13. The spiking holes 15 serve to prevent the refrigerant gas from being trapped between the four laminates 11, 12, 13, 14, by relieving the gas into outside space.

Figure 2:
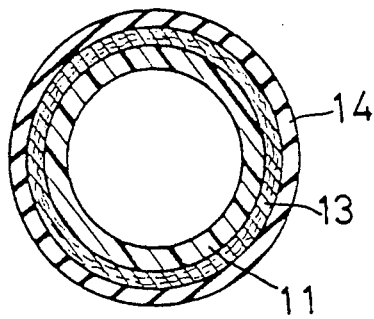
FIGS. 2 through 4 are transverse cross sectional views of other hoses including resinous layers formed of the resinous composition according to the invention.
Figure 4:
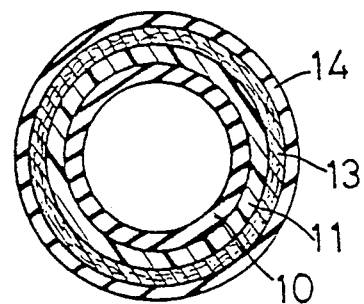
Figure 3:
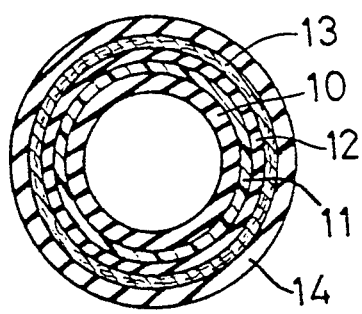
Figure 5:
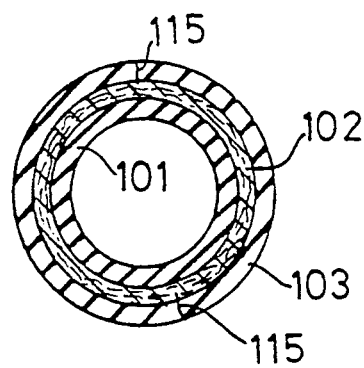
FIG. 5 is a transverse cross sectional view of a conventional hose.

Referring next to FIGS. 2 to 4 there are shown other refrigerant-transporting hoses. The hoses of FIGS. 2–4 are different from the hose of FIG. 1 with respect to the inner tube consisting of the resinous layer 11 and the outer rubber layer 12. In FIG. 2 there is shown the hose whose inner tube consists of a single resinous layer 11 formed of the resinous composition containing as major components thereof at least one of polyester polyamide resin and polyetherester polyamide resin, and saponified ethylene-vinyl acetate copolymer. In FIG. 3 there is shown the hose whose inner tube consists of a three-layered structure which includes an innermost rubber layer 10 and an outer rubber layer 12 between which is interposed a resinous layer 11 formed of the same resinous composition as that of the resinous layer 11 of the hose of FIG. 2. In FIG. 4 there is shown the hose whose inner tube consists of a resinous layer 11 and an innermost rubber layer 10 positioned radially inwardly of the resinous layer 11, in contrast to the inner tube (11, 12) of the hose of FIG. 1.

Each of the refrigerant-transporting hoses of FIGS. 1–4 are excellent in flexibility, heat resistance and gas impermeability due to the high flexibility, heat resistance and gas impermeability of the resinous layer 11 of the inner tube thereof, which layer is formed of the specific resinous composition according to the invention.

DETAILED DESCRIPTION OF THE PREFERRED EMBODIMENTS

Referring to TABLE I there are shown seven gas-impermeable resinous compositions (Examples A through G) according to the present invention. Each of the compositions were prepared by the previously-described known method by using the material(s) indicated in the table. The table also shows the proportion of each material used in the compositions.

TABLE I

|  | INVENTION RESINOUS COMPOSITIONS | | | | | | |
|---|---|---|---|---|---|---|---|
|  | A | B | C | D | E | F | G |
| POLYAMIDE RESIN 1 *1 | 100 | — | — | — | — | — | 71 |
| POLYAMIDE RESIN 2 *2 | — | 100 | 100 | 100 | 100 | 100 | 29 |
| ETHYLENE-VINYL ACETATE COPOLYMER 1 *3 | — | — | 40 | 200 | — | — | — |
| ETHYLENE-VINYL ACETATE COPOLYMER 2 *4 | — | — | — | — | 40 | — | — |
| CHR | — | — | — | — | — | 40 | 40 |

*1: Condensated copolymer of hexamethylene diamine and sebacic acid
*2: Condensated copolymer of hexamethylene diamine and dodecanedicarboxylic acid
*3: The proportion of the ethylene is 32 mol %; the degree of saponification of the vinyl acetate is 95 mol %
*4: The proportion of the ethylene is 38 mol %; the degree of saponification of the vinyl acetate is 90 mol %

Hoses having a structure similar to that of the hose of FIG. 1, were prepared by using the resinous compositions A through G by the following manufacturing method, except for the case of the hoses whose inner tube consists of a three-layered structure, in which at the beginning unvulcanized rubber composition was extruded from an extruder on the rubber mandrel to form a tubular body, i.e. inner rubber layer of the inner tube:

Initially, a resinous composition (i.e., each of Examples A–G) is molten by heat, and the heat-molten resin is extruded from a resin extruder on a rubber mandrel so as to provide a resinous layer 11 thereon, and then the resinous layer is cooled.

Second, adhesive is applied to an outer surface of the resinous layer 11, and unvulcanized rubber composition for the outer rubber layer 12 is extruded thereon from an extruder so as to provide a double-layered inner tube.

Subsequently, adhesive is applied to an outer surface of the inner tube, and a reinforcing fiber layer 13 is formed thereon by braiding, spiralling or knitting with a suitable thread.

Next, adhesive is applied to an outer surface of the reinforcing fiber layer 13, and unvulcanized rubber composition is extruded from an extruder thereon so as to provide an outer rubber tube 14.

Last, the thus-obtained laminated tube is vulcanized to produce an integrally bonded end product, i.e., hose, and then the rubber mandrel is removed from the hose. The vulcanizing temperature is selected at 145° to 170° C., and the vulcanizing time is selected at 30 to 90 minutes.

The material and thickness of each of the laminates of the hoses produced are indicated in an upper portion of TABLE II. Hoses 1 through 8 include resinous layers formed of the resinous compositions A–G. Meanwhile, the first comparative hose (Hose 9) has an inner tube consisting of a single layer formed of NBR. The second comparative hose (Hose 10) has a resinous layer formed of nylon 6, while the third comparative hose (Hose 11) has a resinous layer formed of nylon 6-66 copolymer.

Each of Hoses 1 through 11 was tested with regard to flexibility, gas impermeability and heat resistance. The test results are shown in a lower portion of TABLE II.

The flexibility, gas impermeability and heat resistance were evaluated as follows:

Flexibility

Each of the eleven hoses was cut into a 300 and a 400 mm long specimen, and one of opposite ends of each cut hose was fixed to a plate and the other end thereof was progressively bent to contact the plate. With the other end contacting the plate, the bending stress exerted to the other end was measured. The flexibility of the hoses was evaluated by measurements of the bending stress. Smaller measurement values indicate higher degrees of flexibility.

Gas Impermeability

Each of the eleven hoses was cut into a 500 mm long specimen, and the hose was charged with 40 g of Flon 12 and gas-tightly sealed at opposite ends thereof. The gas-charged hose was maintained at 100° C. for 72 hours. Subsequently the overall weight of the specimen was measured, and was compared with its initial weight immediately after the charging of the Flon gas. The reduced amount (g) of the Flon gas, which had permeated through the wall of the hose into ambient atmosphere, was calculated. Smaller values indicate higher degrees of gas impermeability.

Heat Resistance

Each of the eleven hoses was cut into a 400 mm long specimen, and was placed in an oven at 140° C. for 168 hours. Subsequently the cut hose was wound around a mandrel with a radius of 50 mm, and was inspected for any cracks produced in the inner tube thereof.

TABLE II

|  |  | HOSES INCLUDING RESINOUS LAYERS FORMED OF INVENTION COMPOSITIONS | | | | | | | | COMPARATIVE HOSES | | |
|---|---|---|---|---|---|---|---|---|---|---|---|---|
|  |  | 1 | 2 | 3 | 4 | 5 | 6 | 7 | 8 | 9 | 10 | 11 |
| STRUCTURE OF HOSE | | | | | | | | | | | | |
| INNER TUBE | | | | | | | | | | | | |
| INNER RUBBER LAYER | MATERIAL | — | — | — | — | NBR | CSM | — | — | NBR | NBR | NBR |
|  | THICKNESS (mm) | — | — | — | — | 0.5 | 0.5 | — | — | 3.4 | 0.5 | 0.5 |
| RESINOUS LAYER | MATERIAL | A | B | C | D | E | B | F | G | — | Ny6 *1 | Ny6-66 *2 |
|  | THICKNESS (mm) | 0.2 | 0.2 | 0.15 | 0.15 | 0.15 | 0.15 | 0.25 | 0.25 | — | 0.15 | 0.15 |
| OUTER RUBBER LAYER | MATERIAL | NBR | NBR | NBR | NBR | NBR | CSM | NBR | NBR | — | NBR | NBR |
|  | THICKNESS (mm) | 1.0 | 1.0 | 1.0 | 1.0 | 1.0 | 1.0 | 1.0 | 1.0 | — | 1.0 | 1.0 |
| REINFORCING FIBER LAYER | MATERIAL | PeF *3 | PeF | PeF | PeF | PeF | PeF | PeF | PeF | PeF | PeF | PeF |
| OUTER RUBBER | MATERIAL | EPDM | EPDM | EPDM | EPDM | EPDM | EPDM | EPDM | EPDM | EPDM | EPDM | EPDM |
|  | THICKNESS | 1.4 | 1.4 | 1.4 | 1.4 | 1.4 | 1.4 | 1.4 | 1.4 | 1.4 | 1.4 | 1.4 |

TABLE II-continued

| | | HOSES INCLUDING RESINOUS LAYERS FORMED OF INVENTION COMPOSITIONS | | | | | | | | COMPARATIVE HOSES | | |
|---|---|---|---|---|---|---|---|---|---|---|---|---|
| | | 1 | 2 | 3 | 4 | 5 | 6 | 7 | 8 | 9 | 10 | 11 |
| TUBE EVALUATION | (mm) | | | | | | | | | | | |
| FLEXIBILITY (kgf) | LENGTH OF HOSES: 300 mm | 1.4 | 1.4 | 1.3 | 1.4 | 1.3 | 1.4 | 1.3 | 1.3 | 1.3 | 2.0 | 1.4 |
| | LENGTH OF HOSES: 400 mm | 0.7 | 0.8 | 0.8 | 0.8 | 0.8 | 0.9 | 0.8 | 0.8 | 0.6 | 1.0 | 0.8 |
| GAS IMPERMEABILITY (g/m/72 hours) | | 7 | 7 | 5 | 5 | 5 | 7 | 10 | 9 | 28 | 1 | 6 |
| HEAT RESISTANCE | | N *4 | N | N | N | N | N | N | N | P *5 | N | P |

*1: Nylon 6
*2: Nylon 6-66 copolymer
*3: Polyester fiber
*4: No crack was observed.
*5: Cracks were observed.

As is apparent from the test results shown in TABLE II, all of the hoses (Hoses 1 through 8) including a resinous layer formed of the composition A through G, exhibit excellent characteristics all with regard to flexibility, gas impermeability and heat resistance. In contrast thereto, the first comparative hose (Hose 9) whose inner tube consists of a single NBR layer, suffers from the problem of permitting a large amount of refrigerant gas to permeate therethrough. Therefore, Hose 9 is not suitable for practical use. The second comparative hose (Hose 10) whose inner tube includes a resin layer formed of nylon 6, has an excellent gas impermeability but is unsatisfactory with regard to flexibility. The third comparative hose (Hose 11) whose inner tube includes a resin layer formed of nylon 6-66 copolymer, is satisfactory with regard to flexibility and gas impermeability but suffers from low heat resistance.

While the present invention has been described in its presently preferred embodiments with a certain degree of particularity, it is to be understood that the invention is not limited to the precise details of the illustrated embodiments, but may be embodied with various changes, modifications and improvements which may occur to those skilled in the art without departing from the spirit and scope of the invention defined in the following claims.

What is claimed is:

1. A refrigerant-transporting hose comprising:
an inner tube;
an outer tube located radially outwardly of said inner tube;
a reinforcing fiber layer interposed between said inner and outer tubes, wherein said reinforcing fiber layer and the inner and outer tubes comprise an integral tubular body; and
wherein said inner tube comprises a refrigerant gas-impermeable resinous layer formed of a composition comprising (a) a polyamide resin produced by reaction of hexamethylene diamine and an aliphatic dicarboxylic acid having eight to sixteen carbon atoms and (b) saponified ethylene-vinyl acetate copolymer containing not more than 40 mol % percent of ethylene and not less than 90 mol % of vinyl acetate in the ethylene-vinyl acetate copolymer,
said composition containing not more than 250 parts by weight of said saponified ethylene vinyl acetate copolymer per 100 parts by weight of said polyamide resin.

2. The hose as set forth in claim 1, wherein said inner tube consists of said resinous layer.

3. The hose as set forth in claim 1, wherein said inner tube consists of said resinous layer and an outer rubber layer located radially outwardly of the resinous layer.

4. The hose as set forth in claim 1, wherein said inner tube consists of said resinous layer and an outer rubber layer located radially outwardly of the resinous layer, and an inner rubber layer located radially inwardly of the resinous layer.

5. The hose as set forth in claim 1, wherein said inner tube consists of said resinous layer and an inner rubber layer located radially inwardly of the resinous layer.

6. The hose as set forth in claim 1, wherein said aliphatic dicarboxylic acid is expressed by the following formula:

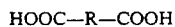

HOOC—R—COOH wherein R is an aliphatic residue having six to fourteen carbon atoms.

7. The hose as set forth in claim 1, wherein said aliphatic dicarboxylic acid comprises at least one acid selected from the group consisting of suberic acid, azelaic acid, sebacic acid, undecanedicarboxylic acid, dodecanedicarboxylic acid, tridencanedicarboxylic acid, tetradecanedicarboxylic acid, pentadecanedicarboxylic acid, and hexadecanedicarboxylic acid.

8. A refrigerant-transporting hose comprising:
an inner tube;
an outer tube located radially outwardly of said inner tube;
a reinforcing fiber layer interposed between said inner and outer tubes, wherein said reinforcing fiber layer and the inner and outer tubes comprise an integral tubular body; and
wherein said inner tube comprises a refrigerant gas-impermeable resinous layer formed of a composition consisting essentially of (a) a polyamide resin produced by reaction of hexamethylene diamine and an aliphatic dicarboxylic acid having eight to sixteen carbon atoms, (b) saponified ethylene-vinyl acetate copolymer containing not more than 40 mol percent of ethylene and not less than 90 mol percent of vinyl acetate in the ethylene-vinyl acetate copolymer, and (c) a rubber selected from the group consisting of chlorosulfonated polyethylene rubber, chlorinated isobutylene-isoprene rubber, ethylene propylene diene rubber, and acrylonitrile-butadiene rubber,
said composition containing not more than 70 parts by weight of said rubber per 100 parts by weight of the polyamide resin, and containing not more than 250 parts by weight of said saponified ethylene-vinyl acetate copolymer per 100 parts by weight of said polyamide resin.

* * * * *